United States Patent [19]
Valentino

[11] 3,748,692
[45] July 31, 1973

[54] OPENER FOR CLAM SHELLS AND THE LIKE

[76] Inventor: Joseph V. Valentino, 1120 Jensen Ave., Mamaroneck, N.Y.

[22] Filed: Dec. 1, 1971

[21] Appl. No.: 203,719

Related U.S. Application Data

[63] Continuation-in-part of Ser. No. 133,212, April 12, 1971.

[52] U.S. Cl. ................................................ 17/76
[51] Int. Cl. ........................................... A22c 29/00
[58] Field of Search ........................................ 17/76

[56] References Cited
UNITED STATES PATENTS
2,747,220  5/1956  Thompson ............................ 17/76

Primary Examiner—Robert Peshock
Attorney—Maxwell James and Harold James

[57] ABSTRACT

An opener for shell fish such as clams, oysters, mussels, scallops and the like, in which the shell is held on a support with the seam between its shell parts exposed, and a knife is mounted on that support for movement toward and away from the shell, thereby to penetrate the seam, and for further movement to sever the seam along its length, thus permitting the shell to be opened and exposing the meat inside the shell. In one embodiment that further movement generally corresponds to the path of the seam, and in a second embodiment it generally corresponds to a prolongation of the penetrating movement.

24 Claims, 10 Drawing Figures

3,748,692

INVENTOR
JOSEPH V. VALENTINO
BY *James and Franklin*
ATTORNEY

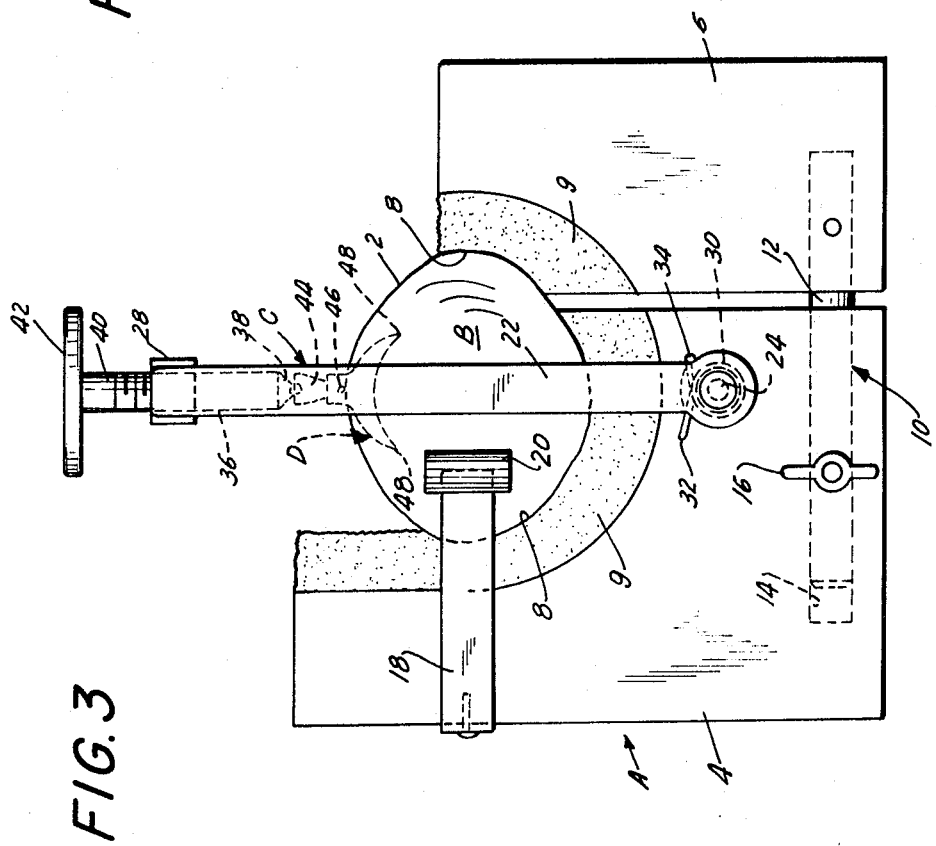

INVENTOR
JOSEPH V. VALENTINO
BY James and Franklin
ATTORNEY

OPENER FOR CLAM SHELLS AND THE LIKE

This application is a continuation in part of my earlier application having the same title, Ser. No. 133,212, filed Apr. 12, 1971.

The present invention relates to improved apparatus for opening shellfish such as clams, oysters, mussels, scallops and the like.

Shellfish are a prized eating delicacy, but they present a very real problem to the gourmet — they are very difficult to open. In order to gain access to the edible meat of the animal, it is necessary to open the shell which surrounds that meat. The animal has very strong connective tissue which secures the two halves of its shell to one another, and this connective tissue resists attempts to open the shell. Ordinarily the connective tissue holds the shell parts closely against one another with an appreciable force, so that it is difficult to pry them apart even a little bit. Even after the shell parts are pried apart slightly, the connective tissue still resists full opening of the shell. Even if that connective tissue is penetrated at a localized area, the length of the seam between the two shell halves will still have substantial amounts of connective tissue active therebetween, so that the shell will still strongly resist opening. It is necessary, if the shell is to be opened, that the connective tissue between the two shell halves be cut over all, or at least a very substantial proportion, of the length of the shell seam.

There are those who, after long experience, can open shellfish very expeditiously merely by dextrous manipulation of a knife. However, such individuals are few in number, and attempts by relatively unskilled individuals to open clam shells or the like with a knife are generally unsuccessful, and, perhaps more importantly, constitute a very real hazard. The knife used must be very sharp; unless it is handled with great skill the individual may well cut himself, and such accidental cuts are usually relatively serious because of the force which must be exerted on the knife when it is being used.

Shellfish of the kind here under discussion are of various types, the shells of which have different shapes. Moreover, even shellfish within a given type will vary somewhat in shape and may vary quite radically in size. Accordingly, it is very difficult to devise apparatus which will effectively perform the shell opening operation and which can be used with shellfish of different types or even with shellfish of the same type which are of different sizes.

Another problem involved in the time required to effect the opening of the individual shellfish. Each clam or the like has but a small morsel of edible meat. In order to make a dish for a person it is necessary that a number of such shellfish be opened, and when a plurality of people are planning to eat together the number of shellfish which may be opened are correspondingly multiplied. Since each shellfish must be individually opened, the time required to carry out the opening operation becomes quite appreciable. Any apparatus which cannot expeditiously accomplish the shell opening operation is of little or no use.

There is another requirement for devices designed to open shellfish. They must be very readily cleanable, since shellfish residue, if permitted to stand, soon becomes quite odoriferous, and an opener which cannot readily be cleaned would soon become a very unwelcome appliance in a kitchen.

It is a prime object of the present invention to devise a shellfish opener which can be used rapidly and effectively by persons with limited amounts of skill, and which will be safe in its manner of operation.

It is another object of the present invention to provide such a device which could be used either in a home, where shellfish are opened only relatively infrequently, or in a restaurant, where shellfish opening may be a very major operation.

It is yet another object of the present invention to devise a shellfish opener which can readily be adapted to function with different types and sizes of shellfish, but which is designed to be manipulated in the same fashion no matter what the type or size of the shellfish may be.

It is yet another object of the present invention to devise such an opener which is simple and sturdy in construction, and which may readily be assembled and disassembled for purposes of cleaning.

A further object of the present invention is to provide such an opener in which the movement of a knife initially to penetrate the shell seam is accomplished in a precisely controlled manner, thereby facilitating the accurate penetration of the seam without fragmenting the shell, after which the seam is further cut to open the shell by means of a rapid movement which, because the seam has alrady been penetrated, will effectively open the shell without fragmentation.

To these ends, the shell opener of the present invention comprises a support adapted to engage and hold a shellfish so that the seam between the shell halves is exposed over at least a very substantial portion of its length. Mounted on the support is a carrier which carries a knife. The knife is adapted to overlie the seam of the shell and to be movable relative to the carrier toward and away from the shell in a precisely controlled manner, thereby initially to penetrate the shell seam and cut the connective tissue between the shell halves. Thereafter the carrier is moved, and this causes the knife to move along therewith, thereby to sever the connective tissue over a sufficient length to permit the shell to be opened. Because the initial penetration of the seam is accomplished in a precisely controlled manner, that initial penetration is achieved without fragmenting the shell, this being desirable so that the shellfish meat can be eaten without danger. The subsequent cutting movement of the knife is carried out rapidly and with a relatively gross type of motion, but because the knife has already been properly aligned with the shell, having previously penetrated the seam thereof, this again can be carried out without danger that fragments of the shell will be formed. A single handle is provided, manual manipulation of which accomplishes both the movement of the knife toward and away from the shell for penetration purposes and the further movement of the knife to complete the opening operation. The support is formed of a pair of adjustably positioned parts which grasp the shellfish between them and hold the shellfish in proper position. The grasping surfaces of the support parts are desirably formed of a spongy material, such as sponge rubber, so as to facilitate the shell engagement without damaging or breaking the shell and thus causing shell fragments to mix with the meat of the animal. The knife may be mounted on its carrier so as to have at least a limited degree of swinging or pivotal motion relative thereto, in order to permit it to adapt itself to the shape of the particular shellfish then being acted on.

To the accomplishment of the above, and to such other objects as may hereinafter appear, the present invention relates to the construction of a shellfish opener, as defined in the appended claims and as described in this specification, taken together with the accompanying drawings, in which:

FIG. 3 is a view similar to FIG. 1 but showing the position of the parts after the knife has been caused to penetrate the shell seam;

FIG. 4 is an end elevational view of the device of FIG. 3;

Figure 7:
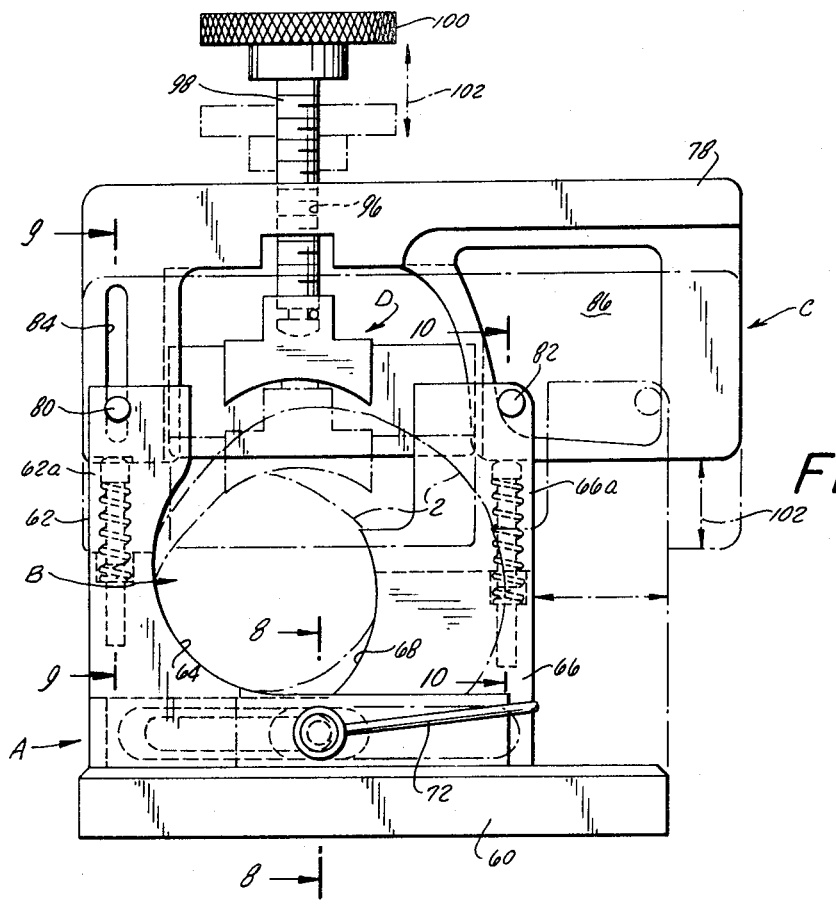
Figures 8, 9, 10:
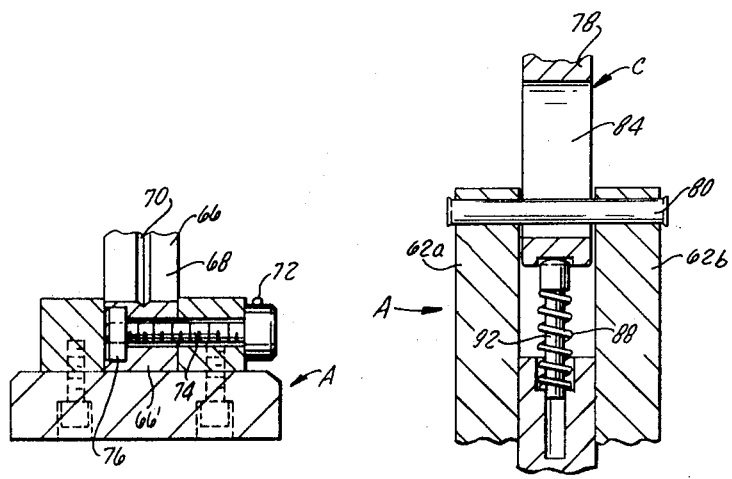

FIG. 7 is a front elevational view of a second embodiment of the shell opener of the present invention, parts thereof being shown in solid lines in the position which they will assume when the opener is used with a smaller shell; and FIGS. 8, 9 and 10 are cross sectional views taken along the lines 8—8, 9—9 and 10—10 respectively of FIG. 7.

The shell opener of the present invention comprises a support generally designated A which is adapted to receive and hold a shell generally designated B with the seam 2 between the two halves of the shell exposed. Mounted on the support A is a carrier generally designated C which carries a knife generally designated D. The knife D is initially movable relative to the carrier C toward and away from the shell B, so that different sizes and types of shells can be mounted on the support A, with the knife B thereafter being moved towards the shell so as to penetrate the connective tissue of the shellfish at the shell seam 2. The carrier C is mounted so as to be movable relative to the support A and to carry the knife D therewith, thereby causing that knife, after it has penetrated the shell B, to sever substantial portions of the length of the shell seam 2, thereby cutting the connective tissue along those substantial length portions. Then the knife D is withdrawn from the shell B, the shell is removed from the support A, and the shell B can readily be opened because there is little or nothing left of the connective tissue which normally tends to retain the shell halves against one another.

In the first disclosed embodiment illustrated in FIGS. 1-6 the support A comprises a pair of parts 4 and 6, each having an exposed portion of its upper surface, generally designated 8, in registration with one another so that a shell B can be grasped therebetween. As there disclosed the shell-engaging surfaces 8 are defined by bodies 9 of soft, compressible material such as sponge rubber, soft rubber or foamed plastic. Means generally designated 10 are provided for adjustably securing support portions 4 and 6 to one another. As there specifically disclosed, the support portion 6 is provided with a rod 12 which is freely slidable within an elongated passage 14 in the support portion 4, the latter being provided with a set screw 16 which engages the rod 12 and holds it in position. When the device is to be used the set screw 16 is loosened, the parts 4 and 6 are separated, a shell B of desired type and size is located in 8, space defined between the surfaces [and the support parts 4 and 6 are pushed together until the shell B is firmly held in place with its seam 2 uppermost and exposed. Then the set screw 16 is tightened, thus holding the support parts 4 and 6 in adjusted position while those parts firmly grasp and hold the shell B. It is preferred, in order to increase the reliability with which the shell B is held in position, both during the adjusting of the support parts 4 and 6 and thereafter, to provide resilient arms 18 on the support part 4, those arms terminating in shell-engaging enlarged portions 20, the arms 18 with their end portions 20 thus serving to hold and to steady the shell B when it is grasped between the support parts 4 and 6.

In the embodiment of FIGS. 1-6 the carrier C comprises an elongated lever arm 22 which is pivotally mounted on the support part 4 at 24. It extends well beyond the surfaces 8 of the support parts 4 and 6, and then has a laterally extending part 26 which extends over the shell-engaging surface 8 and terminates in a sleeve 28 which is internally threaded. If desired, and as is preferable, a torsion spring 30 may be mounted about the pivotal axis 24, with one end 32 thereof anchored in the support part 4 and with the other end 34 thereof active against a side surface of the carrier 22, thereby resiliently to retain that carrier in a desired position, such as its vertical position.

An externally threaded screw part 36 is threadedly received inside the sleeve 28, that screw part 36 having a tipped portion 38 which extends toward the shell-engaging surfaces 8 of the support parts 4 and 6 and an upper portion 40 which extends away from those shell-engaging surfaces 8 and terminates in a handle 42. The knife D is mounted on the downwardly extending tip portion 38 of the threaded part 36. It preferably is mounted thereon so as to have a limited degree of swinging movement relative thereto. To that end, and as may best be seen in FIG. 6, a mounting part 44 extends downwardly from the tip portion 38 of the screw part 36, and the knife D is pivotally mounted about that part by means of pin 46. The knife D preferably has a pair of oppositely positioned downwardly depending sharpened points 48, with both the outer and inner edges of those portions 48 preferably being sharp.

When a given shell B is to be opened, the handle 42 will be rotated so as to lift the knife D sufficiently to clear the particular shell B which is to be operated upon. After that shell B has been clamped between the support parts 4 and 6, the carrier 22 being at that time in a vertical position as urged by the spring 30, the handle 42 is rotated so as to cause the knife D to move downwardly toward the shell seam 2. As this is done, the operator may move the shell B slightly from side to side to ensure that the points of the knife edges accurately penetrate the shell seam 2 without damaging the shell. This operation is continued, as shown in FIG. 3, until the knife D penetrates the shell seam 2 to an appreciable degree. As is best seen in FIG. 4, the side surfaces 50 of the knife D taper upwardly and outwardly, so that the penetration of the shell seam by the knife D not only cuts the connective tissue but tends to pry or wedge the shell halves apart.

Figure 1:
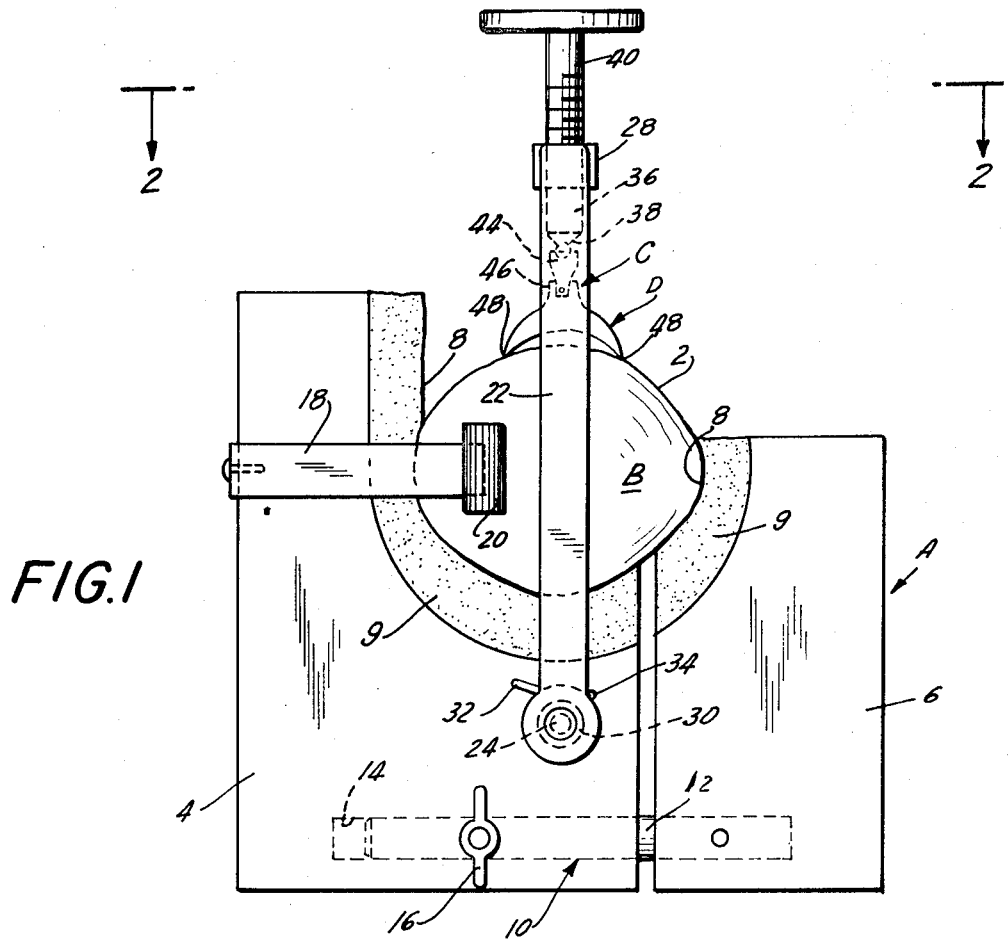
FIG. 1 is a side elevational view of one embodiment of the shell opener of the present invention, showing a shell in place thereon just prior to being opened.
Figure 2:
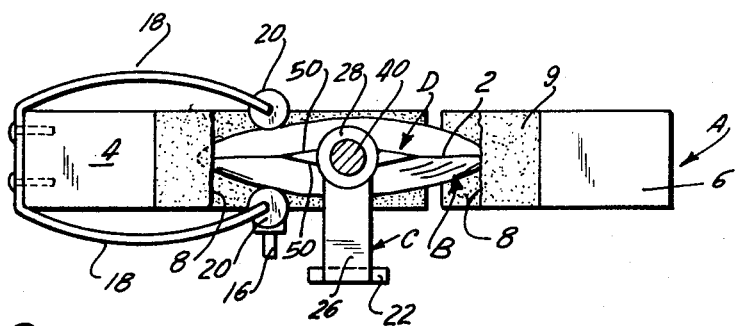
FIG. 2 is a top plan view thereof, taken along the line 2—2 of FIG. 1.
Figure 5:
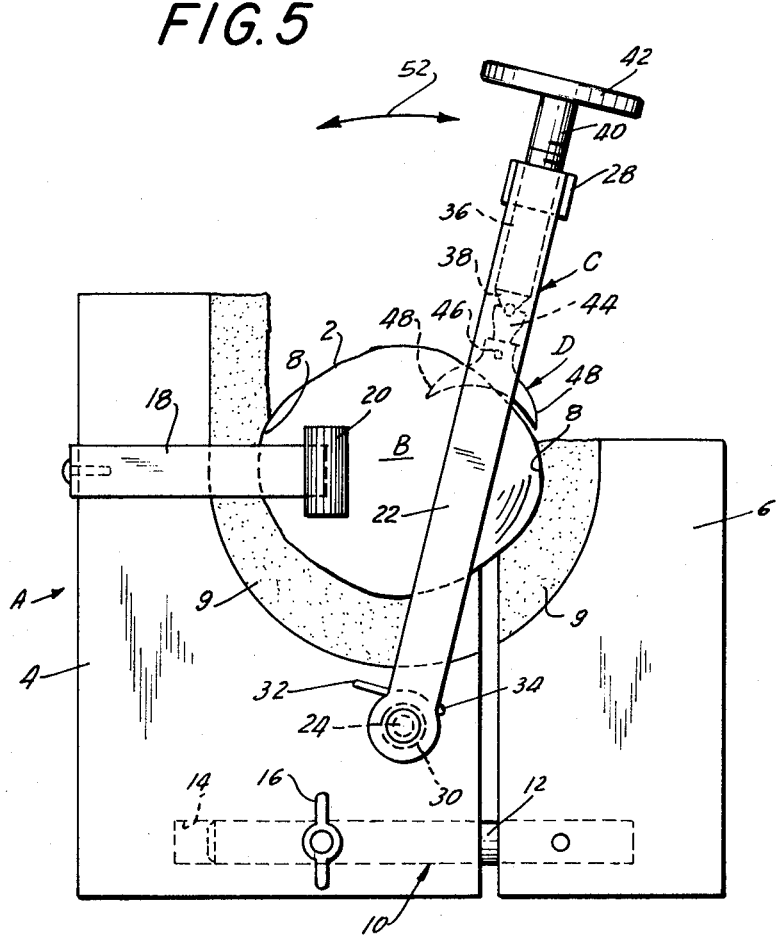
FIG. 5 is a view similar to FIG. 3 but showing the manner in which the carrier and knife are moved to sever the connective tissue along the length of the exposed shell seam.
Figure 6:
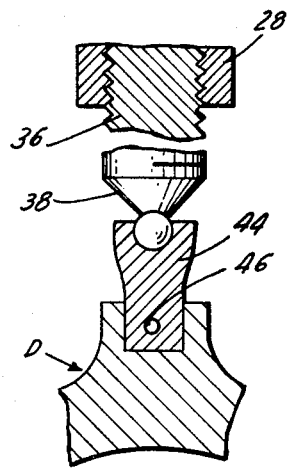
FIG. 6 is an enlarged fragmentary section showing the manner in which the knife is mounted on the carrier.

Thereafter, as shown by arrow 52 in FIG. 5, the handle 42 is grasped and moved laterally to one side and the other, thereby causing the knife D to traverse a generally arcuate path which substantially conforms to the path of the shell seam 2. As the knife D thus moves, it cuts the connective tissue along those portions of the length of the shell seam 2 which are thus traversed.

The handle 42 is then rotated in a knife-retracting direction, the knife D is withdrawn from the shell B, and the shell B can then be removed from the support A, usually without having to manipulate the support A in any fashion, the shell then being readily manually openable merely by pulling the two shell halves apart.

In the embodiment of FIGS. 7-10, the support A comprises base 60 having a fixed upstanding part 62 with a curved shell-grasping surface 64, and slidably mounted on the base 60 and movement toward and away from the fixed upstanding part 62 is a movable upstanding part 66 having a curved grasping surface 68 opposing the surface 64. The surfaces 64 and 68 may be lined with a soft material such as is designated by the reference numberal 9 in FIGS. 1-6, but they are here specifically shown as being relatively rigid and provided with shell-edge-receiving grooves 70. The part 66 is moved toward or away from the part 62, as indicated by the solid and broken lines in FIG. 7, in accordance with the size of the shell to be grasped thereby, and the parts 62 and 66 are adapted to be clamped in position by actuating arm 72 which rotates screw 74 moving clamp nut 76 toward and away from a side surface of the horizontal part 66' of the part 66, as best shown in FIG. 8.

The carrier C in the embodiment of FIGS. 7-10 comprises plate 78 slidably received between bifurcated upwardly extending portions 62a and 62b of part 62 and portions 66a and 66b of part 66. Fixed pins 80 and 82 cross the space between the bifurcated portions 62a, 62b and 66a, 66b respectively and are received within openings 84 and 86 respectively in the plate 78, the opening 84 extending vertically and having a width substantially that of the pin 80, the opening 86 also extending vertically and having a very appreciable lateral width, thereby to permit lateral movement of the part 66 relative to the part 62 to accommodate shells of different sizes. The plate 78 is normally urged to an upper position by means of springs 88 and 90 mounted respectively in the spaces between the bifurcated portions 62a, 62b and 66a, 66b, those springs permitting downward movement of the carrier C when that is desired. For guiding purposes the springs 88 and 90 cooperate with rods 92 and 94 respectively.

The carrier plate 78, at a point above the shell-receiving space defined between the surfaces 64 and 68, is provided with an internally threaded opening 96 within which screw 98 is received, that screw being provided with a handle 100 at its upwardly extending end, and having the blade D mounted in any appropriate manner on its downwardly extending end.

With the embodiment of FIGS. 7-10, when a given shell B is to be opened the handle 100 will be rotated so as to lift the knife D substantially to its position shown in solid lines in FIG. 7. The part 66 will be moved away from the part 64, the shell will be inserted therebetween, and the part 66 will then be moved back toward the part 64 until the shell seam is grasped in the notches 70 formed in the shell-grasping surfaces 64 and 68. The parts 64 and 66 will then be locked in position through appropriate manipulation of the handle 72. Thereafter, and while the carrier C remains in its spring-urged upper position, the handle 100 is rotated so as to cause the knife D to move downwardly toward the shell seam 2. As this is done, the operator may move the shell B slightly from side to side to ensure that the knife edge accurately penetrates the shell seam without damaging the shell. This operation is continued until the knife D penetrates the shell seam 2 to an appreciable degree. This precision seam penetration operation is essentially the same as that performed in connection with the earlier described embodiment.

Thereafter, and as shown by the arrows 102 in FIG. 7, the handle 100 is pushed down, moving the carrier C defined by the plate 78 along therewith against the action of the springs 88 and 90, the slots 84 and 86 through which the pins 80 and 82 respectively pass permitting this movement. With this movement the knife D penetrates the seam more completely than before and, because of its outwardly tapered shape, such as is shown in FIG. 4, it positively wedges the shell open, stretching and breaking enough of the seam membrane which is not actually cut so that the shell is effectively opened. In this downward movement the operator may, while he holds the knob 100 between his fingers, place the heel of his hand on that portion of the upper surface of the plate 78 which extends outwardly and to the right from the handle 100 as viewed in FIG. 7, thus ensuring that a firm and strong downward force is applied to the knife D and that the knife D is moved downwardly rather than merely being rocked.

Thereafter the downward pressure on the carrier C will be released, the springs 88 and 90 will restore the carrier C, and with it the knife D, to its upper position, the handle 72 will be manipulated to unlock the parts 62 and 66, those parts can be slid away from one another and the shell B can be remoyeed from the device. It may or may not be necessary to rotate the handle 100 to move the knife D further upwardly, depending upon the degree to which it had previously been moved downwardly relative to the carrier C, the extent to which the shell had been opened, and the precise size of the next shell to be opened.

The parts of the openers here disclosed are extremely sturdy and simple, they are readily exposed for cleaning purposes or for replacement in the unlikely event that any of them should become damaged, the device may readily be manipulated and operated with minimal risk of breaking the shell and producing fragments which might be a hazard to those eating the meat of the shellfish, and a large number of shells may rapidly and effectively be opened in a short period of time, particularly where, as is usually the case, the shells being opened at any one time are all of roughtly the same size.

While but a limited number of embodiments of the present invention have been here specifically disclosed, it will be apparent that many variations may be made therein, all within the scope of the instant invention as defined in the following claims.

I claim:

1. A shell opener comprising a support, means on said support for engaging and holding a shell with its seam exposed and extending substantially in a given path, a carrier operatively mounted on said support, extending beyond said support and movable in a path generally conforming to the path of said seam, and a knife mounted on said carrier so as to be movable therewith and movable relative thereto toward and away from said shell holding means, whereby said knife may be caused to penetrate said shell seam by virtue of said relative movement and may then be moved along said seam to open said shell.

2. The shell opener of claim 1, in which said carrier is pivotally operatively connected to said support for arcuate move-ment.

3. The shell opener of claim 2, in which said knife is mounted on said carrier for limited swinging movement relative thereto.

4. The shell opener of claim 1, in which said carrier comprises a handle part extending outwardly from said knife.

5. The shell opener of claim 4, in which said handle part comprises an actuator for positioning said knife relative to said carrier, manipulation of said handle part in one sense causing said knife to shift its position relative to said carrier and thereby move toward and away from said shell, manipulation of said handle part in another sense causing said carrier and knife to move together relative to said support, thereby to cut said shell seam along the length thereof.

6. The shell opener of claim 5, in which said carrier is pivotally operatively connected to said support for arcuate movement.

7. The shell opener of claim 6, in which said knife is mounted on said carrier for limited swinging movement relative thereto.

8. The shell opener of claim 4, in which said carrier is pivotally operatively connected to said support for arcuate movement.

9. The shell opener of claim 8, in which said knife is mounted on said carrier for limited swinging movement relative thereto.

10. The shell opener of claim 1, in which said support comprises first and second parts having cooperating shell-gripping surfaces, and means for securing said parts to one another in adjustable relative position.

11. The shell opener of claim 10, in which said shell-gripping surfaces are defined by sponge-like material.

12. In the shell opener of claim 10, resilient means mounted on said support, having free portions located above said shell-gripping surfaces, and adapted to engage the exposed surface of a shell held in said opener and to steady the latter.

13. The shell opener of claim 1, in which said carrier comprises an arm pivotally mounted on said support, extending beyond said support, and having a part overlying said support, screw means threadedly operatively connected to said part and having portions extending from said part respectively toward and away from said support, said knife being mounted on the portion thereof extending toward said support, and a handle mounted on a portion thereof extending away from said support.

14. The shell opener of claim 13, in which said knife is mounted on the corresponding portion of said screw means for limited swinging movement relative to said portion.

15. A shell opener comprising a support, means on said support for engaging and holding a shell with its seam exposed, a carrier operatively mounted on said support and movable in a seam-cutting direction, and a knife mounted on said carrier so as to be movable therewith and also movable relative thereto in a direction toward and away from said shell holding means, and actuating means operatively connected to said knife and active to cause said knife to thus move relative to said carrier, whereby said knife may be caused to penetrate said shell seam while said carrier is stationary, after which said carrier can be moved to cut said seam.

16. The shell opener of claim 15, in which said actuating means comprises screw means threadedly mounted in said carrier, said knife being operatively mounted on said screw means.

17. The shell opener of claim 16, in which said screw means comprises a handle part extending from said carrier, rotation of said handle part causing said knife to move relative to said carrier, movement of said handle part in another sense causing said carrier and said knife to move together.

18. The shell opener of claim 15, in which said carrier is pivotally operatively connected to said support for arcuate move-ment.

19. The shell opener of claim 15, in which said carrier is mounted on said support for movement in a given direction toward and away from said shell holding means.

20. The shell opener of claim 19, in which said handle part comprises an actuator for positioning said knife relative to said carrier, manipulation of said handle part in one sense causing saidknife to shift its position relative to said carrier and there-by move toward and away from said shell, manipulation of said handle part in another sense causing said carrier and knife to move to-gether relative to said support, thereby to cut said shell seam along the length thereof.

21. The shell opener of claim 20, in which said carrier comprises a part extending laterally out from said actuator, whereby the actuator may be grasped by the fingers and said part engaged by the heel of the operator's hand.

22. The shell opener of claim 21, in which said heel holding means comprises two relatively movable parts, said carrier being operatively connected to both of said parts by means permitting movement of said carrier in said given direction and means permitting movement of one of said parts relative to said carrier in a direction substantially at right angles to said given direction.

23. The shell opener of claim 19, in which said heel holding means comprises two relatively movable parts, said carrier being operatively connected to both of said parts by means permitting movement of said carrier in said given direction and means permitting movement of one of said parts relative to said carrier in a direction substantially at right angles to said given direction.

24. A shell opener comprising a support, means on said support for engaging and holding a shell with its seam exposed, a carrier operatively mounted on said support and movable in a seam-cutting direction, lengthwise of said seam and a knife mounted on said carrier, said shell holding means comprising two relatively movable parts, said carrier being operatively connected to both of said parts by means permitting movement of said carrier in said seam-cutting direction and means permitting movement of one of said parts relative to said carrier in a direction substantially at right angles to said seam-cutting direction.

* * * * *